May 19, 1936.  L. E. LA BRIE  2,041,476
BRAKE
Filed Dec. 4, 1930
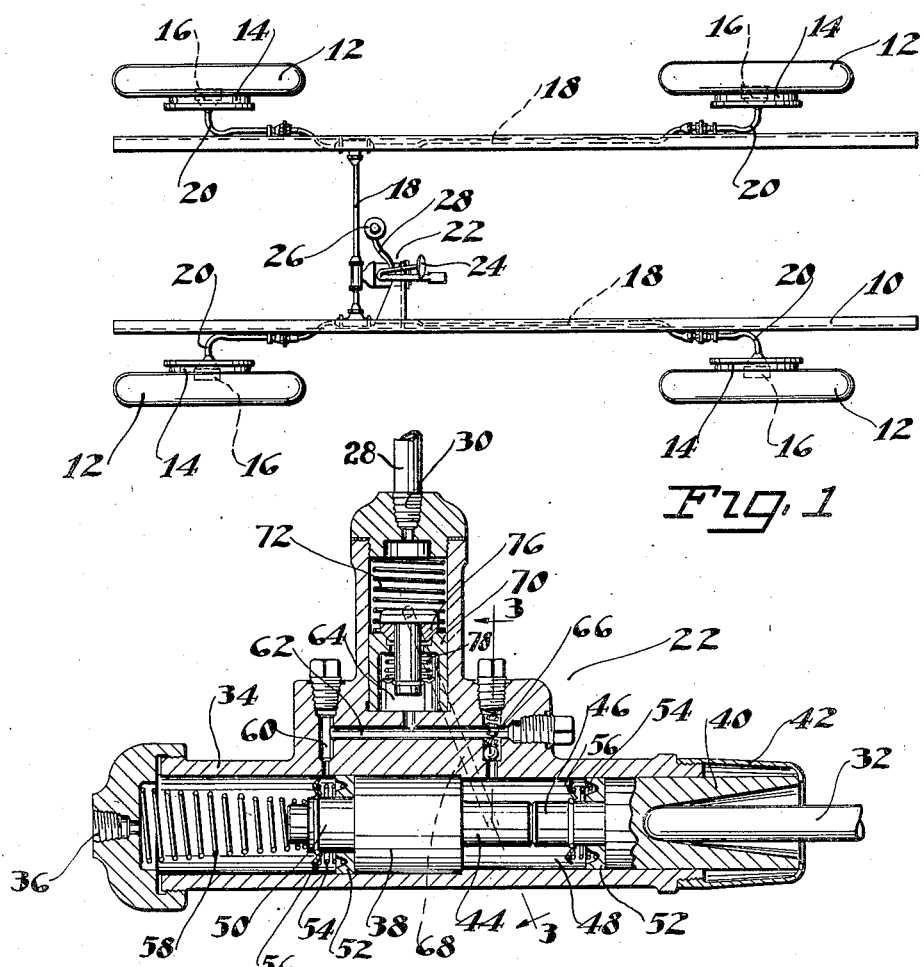
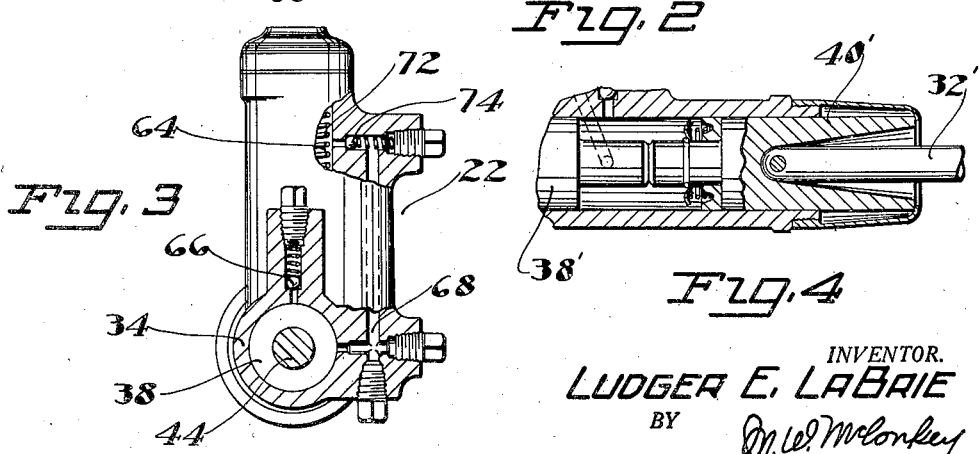
INVENTOR.
LUDGER E. LaBRIE
BY
ATTORNEY Patented May 19, 1936

2,041,476

UNITED STATES PATENT OFFICE 2,041,476

BRAKE

Ludger E. La Brie, South Bend, Ind., assignor to Bendix Brake Company, South Bend, Ind., a corporation of Illinois Application December 4, 1930, Serial No. 499,921

5 Claims. (Cl. 60—54.6)

This invention relates to brakes, and is illustrated as embodied in a novel master cylinder assembly for a system of four-wheel hydraulic automobile brakes.

An object of the invention is to provide this assembly with simple and effective means for keeping the system filled with liquid, preferably in a manner maintaining the system under sufficient pressure to prevent sucking air into the fluid lines in using the brakes.

Various features relate to securing the desired action by the use of a novel two-part piston device, preferably operating in a double-diameter cylinder to give the necessary pumping action; to the arrangement of the passages and valves and the like which renders the piston device operatively effective; to the provision of means, such as a yieldingly-held piston in a novel auxiliary chamber, for maintaining sufficient pressure on the lines to prevent sucking air into them; and to the use of a relief valve in the yieldingly-held piston or its equivalent to permit the return to the usual reservoir of any excess liquid pumped therefrom by the two-part piston device or its equivalent.

The above and other objects and features of the invention, including various novel and desirable details of construction, will be apparent from the following description of the illustrative embodiment shown in the accompanying drawing, in which:

Figure 1 is a diagrammatic top plan view of an automobile chassis having a system of hydraulic brakes;

Figure 2 is a longitudinal section through the novel master cylinder assembly forming part of the hydraulic brake system;

Figure 3 is a section on the line 3—3 of Figure 2, partly broken away rearwardly of the line 3—3 to show the valve controlling a passage from the reserve liquid supply; and Figure 4 is a view similar to Figure 2 disclosing a modified form of a master cylinder assembly.

The chassis illustrated in Figure 1 includes a frame 10, supported by the usual springs on axles (not shown) carried by front and rear road wheels 12 having fluid-operated brakes 14 of any desired character. The brakes are operated by the usual wheel cylinder assemblies 16, to which fluid under pressure may be conducted by lines or conduits including pipes 18 on the chassis frame and flexible sections 20 connecting the pipes to the wheel cylinders 16.

Pressure is applied to the fluid lines by a master cylinder assembly 22, shown as operated by a service brake pedal 24, and which master cylinder assembly forms the subject of the present invention. A reservoir 26 for a reserve supply of liquid is connected to this assembly by means such as a conduit 28 communicating with a port 30. The pedal 24 or its equivalent may operate through means such as a piston rod 32.

The master cylinder assembly 22 may include a cylinder proper 34, shown made as a casting, with a large diameter portion at its left end, i. e. the end formed with an outlet 36 to the fluid lines 18, and with a slightly smaller diameter portion at its right end. Inside the cylinder is a two-part piston device, part 38 being of larger diameter than part 40, and the two parts being arranged in the cylinder parts of corresponding diameter. Piston part 40 is operatively engaged by the piston rod 32. The idle or released position of the piston device may be determined by engagement of the skirt of part 40 with a stamped cap 42 which may be threaded on the end of the cylinder.

The larger piston part 38 has a rearwardly projecting extension 44, disconnectedly engaging a forwardly projecting extension 46 formed on the smaller piston part 40, thereby determining a fluid chamber 48 between the two pistons acting as a liquid seal for the piston 38. Piston 38 is formed with a projection 50, on which is sleeved a sealing member or piston ring 52 of rubber or the like, held by a spring 54 compressed between the sealing member and a stop 56 on the end of projection 50. A similar sealing member 52 is also mounted on the projection 46.

A light return spring 58 is arranged between projection 50 and the end of the cylinder, this spring being only heavy enough to insure that in its released position the piston 38 will clear a port 60 in the cylinder wall. The principal returning force for the entire brake system is derived from the usual return springs (not shown) of the brakes 14.

Port 60 forms an outlet from a passage 62, communicating with an auxiliary chamber or cylinder 64 at one side of the assembly and into which the intake 30 opens; the passage 62 also communicates with a port opening into the cylinder between the pistons 38 and 40 and which is controlled by means such as a spring-pressed ball check valve 66 opening outwardly from the cylinder into the passage.

There is also a direct passage 68 from the part of the cylinder between the two pistons opening into the auxiliary chamber 64 above a control piston 70 urged yieldingly toward the bottom of its stroke by means such as a spring 72. The passage 68 is controlled by means such as a spring-pressed ball check valve 76 opening outwardly from the auxiliary chamber 64 into the passage 68.

The auxiliary or control piston 70 has a central passage therethrough, and is provided with a poppet valve 76 normally closing the central passage, and held yieldingly in closed position by a spring 78 which is heavier than spring 72. The spring 78 yields, to permit overflow of excess liquid back through intake 30 to reservoir 26, after the spring 72 is compressed to the same resistance as spring 78, thereby building up a pressure below piston 70 which is predetermined by the difference in strength of the springs 72 and 78.

In Figure 4 there is disclosed a modified form of master cylinder wherein a piston rod 32' is positively connected to the piston 40' and the pistons 40' and 38' are made of the same diameter. In all other respects the construction is the same as the master cylinder of Figure 2 and the operation of both types is described in detail hereinafter.

In operation, depression of the pedal forces the double piston device 38—40 to the left to apply the brakes. At the same time, since piston 38 is of larger diameter than the piston 40, the depression of the pedal and consequent movement of the pistons sets up a suction in the space 48 between the pistons, drawing liquid into the cylinder past the valve 76, through passage 68, from the upper part of the auxiliary chamber 64 (i. e., from the reservoir).

Now, when the brakes are released, and the pistons 38 and 40 return to the initial positions shown in Figure 2, this additional liquid is forced upwardly past valve 66 into the passage 64 by the springs at the brake. Spring 72 is thus compressed until the desired pressure to be imposed upon the lines is reached, this pressure being determined by the pressure differential between springs 72 and 78. This degree of super-atmospheric pressure, insufficient however, to apply the brakes against the resistance of their return springs, suffices to always maintain the lines full of liquid and obviates the ingress of air in the off position of the brakes.

The excess liquid pumped by the piston 38 passes through the relief poppet valve 76 and into the reservoir. It is to be particularly noted that the above described operation is largely predicated on the relative strengths of springs 58 and the spring of the check valve 66, the former being quite weak to insure maintaining the lines and chamber forward of the piston 38 full of liquid at all times. The spring 58 merely functions to insure the ultimate return of the piston 38 back to its seat.

The operation of the cylinder of Figure 4 is substantially the same as that of Figure 3 with the exception that the overcharge of liquid into the chamber 48' is effected by virtue of the usual quick return of the pedal carrying with it the positively connected piston 40'. This creates a vacuum in the chamber 48' and effects the overcharge. This excess of liquid is then forced into the chamber 64 on the return stroke of the piston 38' in a manner similar to the cylinder of Figure 3.

A system is thus provided wherein a positive pressure is maintained at all times upon the liquid. The design is also such as to maintain at all times a system completely full of liquid. These two features of course avoid the entrance of air into the lines and cylinders which is the object desired in all hydraulic controls.

While one illustrative embodiment has been described in detail, it is not my intention to limit the scope of the invention to that particular embodiment, or otherwise than by the terms of the appended claims. The present application is junior to my application No. 497,383, filed November 22, 1930.

I claim:

1. A fluid brake control system comprising fluid lines, in combination with a fluid reservoir, a master cylinder assembly including a piston for putting pressure on fluid in said lines to apply the brakes, means comprising said piston for drawing fluid from said reservoir on the brake applying stroke, and means for trapping said fluid drawn from said reservoir and for co-operating with the piston on the brake-releasing stroke to force additional fluid into the said fluid lines.

2. A brake system comprising fluid lines, in combination with a fluid reservoir, a master cylinder assembly including a piston for putting pressure on fluid in said lines to apply the brakes, means including said piston for drawing liquid from said reservoir, and means for trapping fluid drawn from said reservoir and for co-operating with the piston on the brake-releasing stroke to build up a static pressure on the fluid in said lines.

3. A double diameter cylinder having the larger diameter nearer the forward end thereof and containing a two-part piston device of corresponding diameters and arranged with a space between the parts, an intake passage opening into the space between the two piston parts, an inwardly opening check valve in said passage, a by-pass passage from said space into the end of the cylinder ahead of the large diameter piston part, and an outwardly opening check valve in said by-pass passage whereby actuation of the brake system pumps liquid to fill the brake system and to accumulate a surplus for use in the system.

4. A double diameter cylinder connected to said fluid line and containing a two-part piston device of corresponding diameters having a space between said two parts, in combination with a reserve liquid supply communicating with the space between the two parts of the piston, a check valve controlling the communication between the reserve liquid supply and said space, means cooperating with said piston for moving it in one direction to apply the brake, and an auxiliary chamber into which movement of the piston device in the other direction pumps liquid from said space.

5. A cylinder having an auxiliary chamber at one side communicating with the interior of the cylinder by two ports, in combination with a piston device in the cylinder formed in two disconnectedly operatively engaging parts, one port opening in front of the released position of the front piston part and the other port opening between the piston parts, together with means for exerting pressure on the liquid in the auxiliary chamber, and a valve controlling one of said ports.

LUDGER E. LA BRIE.